(12) United States Patent  
Clingman et al.

(10) Patent No.: US 8,490,926 B2
(45) Date of Patent: Jul. 23, 2013

(54) MULTI-STAGE FLOW CONTROL ACTUATION

(75) Inventors: Dan John Clingman, Auburn, WA (US); Edward Andrew Whalen, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 722 days.

(21) Appl. No.: 12/696,529

(22) Filed: Jan. 29, 2010

(65) Prior Publication Data

US 2011/0186132 A1   Aug. 4, 2011

(51) Int. Cl.
*B64C 21/04*   (2006.01)

(52) U.S. Cl.
USPC ............................. 244/207; 244/208; 244/209

(58) Field of Classification Search
USPC .................. 244/199.1, 200, 200.1, 201, 203, 244/204, 204.1, 207, 208, 209
See application file for complete search history.

(56) References Cited

U.S. PATENT DOCUMENTS

| | | | |
|---|---|---|---|
| 3,736,983 A | 6/1973 | Beard et al. | |
| 5,758,823 A | 6/1998 | Glezer et al. | |
| 5,798,600 A | 8/1998 | Sager et al. | |
| 5,889,354 A | 3/1999 | Sager | |
| 5,957,413 A | 9/1999 | Glezer et al. | |
| 6,056,204 A | 5/2000 | Glezer et al. | |
| 6,123,145 A | 9/2000 | Glezer et al. | |
| 6,471,477 B2 * | 10/2002 | Hassan et al. | ............... 416/90 A |
| 6,682,313 B1 | 1/2004 | Sulmone | |
| 6,692,571 B2 | 2/2004 | Jones et al. | |
| 6,722,581 B2 | 4/2004 | Saddoughi | |
| 6,827,559 B2 | 12/2004 | Peters et al. | |
| 2002/0190165 A1 | 12/2002 | Glezer et al. | |
| 2002/0195526 A1 | 12/2002 | Barrett et al. | |
| 2006/0185822 A1 | 8/2006 | Glezer et al. | |

FOREIGN PATENT DOCUMENTS

| | | |
|---|---|---|
| FR | 2896757 A3 | 8/2007 |
| JP | 6147104 A | 5/1994 |

OTHER PUBLICATIONS

International Search Report and Written Opinion for PCT/US2010/061145 dated Mar. 11, 2011.

* cited by examiner

*Primary Examiner* — Timothy D Collins
*Assistant Examiner* — Jamie S Stehle
(74) *Attorney, Agent, or Firm* — Hope Baldauff, LLC

(57) ABSTRACT

Concepts and technologies described herein provide for the creation of an actuating fluid flow utilizing a multi-stage actuator. According to one aspect of the disclosure provided herein, a fluid actuation system includes at least two stages, each stage having a plenum and one or two diaphragms acting on the plenum to create an actuating fluid flow. The diaphragms of each stage may be substantially aligned along an axis. The actuating flow is aggregated between stages and expelled into a fluid flow to be controlled. According to various aspects, the diaphragms may include piezoelectric discs.

11 Claims, 5 Drawing Sheets

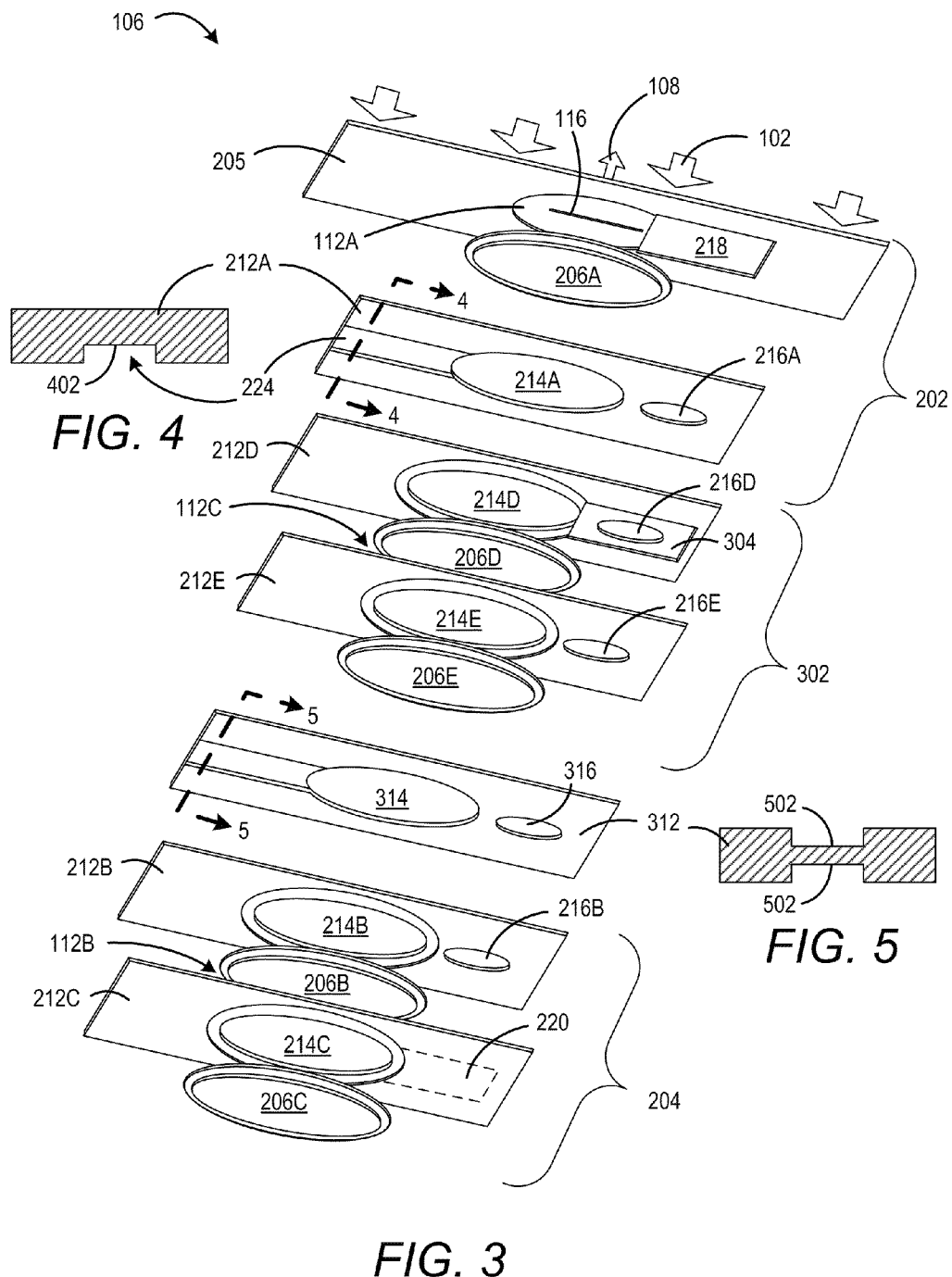

MULTI-STAGE FLOW CONTROL ACTUATION

BACKGROUND

Flow control actuators are commonly used to control the flow characteristics of an airstream or other fluid flow. For example, airflow over an airfoil can be manipulated using flow control actuators to alter the separation location of the flow on the airfoil. There are numerous types of existing flow control actuators used to control some characteristic of an airflow. For many applications, a preferred mechanism for controlling an airflow is to use a synthetic jet actuator to expel a stream or pulse of air into the airflow at controlled velocities, frequencies, quantities, and locations. Synthetic jet actuators often use a piezoelectric disc or other mechanism to alternately suck air into and expel air out of a plenum, or air chamber, and into the ambient airflow.

However, due to limitations in the material properties of existing piezoelectric discs, the velocity of the air expelled into the ambient airflow is limited, which limits the effectiveness of a synthetic jet actuator using a piezoelectric disc when the velocity of the airflow to be manipulated is increased. Specifically, to increase the output velocity from typical piezoelectric synthetic jet actuators using existing actuator architectures having a single piezoelectric disc or two opposing discs, very high authority actuators are required. These high authority actuators require large piezoelectric discs that significantly increase the footprint of the actuator. Even with these configurations, one or two piezoelectric discs within a single synthetic jet actuator is often not sufficient to provide the desirable actuating flow characteristics for manipulating the ambient airflow in a satisfactory manner.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a multi-stage synthetic jet actuator that creates an actuating flow suitable for controlling high velocity ambient fluid flows. According to one aspect of the disclosure provided herein, a fluid actuation system includes an interior actuation mechanism and a peripheral actuation mechanism. The interior actuation mechanism includes a first diaphragm and plenum, while the peripheral actuation mechanism includes second and third diaphragms surrounding a second plenum. The two plenums are fluidically connected such that actuating flow created by the diaphragms can flow between the plenums and out of the first plenum through an exit aperture. The peripheral actuation mechanism is connected to the interior actuation mechanism so that the first, second, and third diaphragms are substantially aligned.

According to another aspect, a method for providing an actuating fluid flow includes alternately compressing and expanding a first plenum with a first diaphragm. A second plenum is alternately compressed and expanded with a second diaphragm and a third diaphragm in coordination with the compression and expansion of the first plenum. A fluid flow created by the alternating compression and expansion of the second plenum is routed to the first plenum and expelled from the first plenum through an exit aperture.

According to yet another aspect of the disclosure, a fluid actuation system includes a number of stages, each of which includes a plenum and at least one piezoelectric disc that alternately compresses and expands the plenum. The stages are positioned in a stacked configuration with each piezoelectric disc and plenum aligned along a central axis. A fluid pathway connects the plenums and an exit aperture expels the actuating flow created by the compression and expansion of each plenum.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 3 is an exploded perspective view of a fluid actuation system having three actuation mechanisms according to various embodiments presented herein;

FIG. 4 is a cross-sectional view of a diaphragm plate along lines 4-4 of FIG. 3, the cross-sectional view illustrating a vent mechanism according to various embodiments presented herein;

FIG. 5 is a cross-sectional view of a vent plate along lines 5-5 of FIG. 3, the cross-sectional view illustrating a vent mechanism according to various embodiments presented herein;

DETAILED DESCRIPTION

The following detailed description is directed to systems and methods for providing an actuating fluid flow utilizing a synthetic jet actuator having a multi-stage architecture. As discussed above, conventional synthetic jet actuators are not capable of providing actuating flows capable of satisfactorily manipulating high-speed airflows, while maintaining a minimum footprint. Conventional synthetic jet actuators often utilize a single piezoelectric driver to compress and expand a plenum, which forces the air within the plenum out of a hole or slit and into an external stream of air to be actuated. In order to increase the velocity of the actuating flow produced by the synthetic jet actuator, two piezoelectric drivers may be configured on opposite sides of the plenum to increase the flow output. However, further increasing the flow output while maintaining a minimal actuator footprint has not previously been possible given conventional actuator configurations and piezoelectric material properties.

Utilizing the concepts and technologies described herein, a multi-stage synthetic jet actuator configuration allows for more than two piezoelectric discs to be stacked and coordinated in a manner that significantly increases the output of the actuator as compared to a conventional actuator, without increasing its footprint. It should be understood that the various embodiments of this disclosure will be described in the context of creating an actuating airflow to be introduced to an ambient airflow for the purposes of controlling some aspect of that ambient airflow. This implementation is useful in the context of controlling an airflow over an airfoil. However, the concepts presented herein are equally applicable to any application in which it would be desirable to increase the output, or the velocity of the output, of a fluid from a conventional synthetic jet actuator. The actuating and/or ambient fluid could be air, water, or any other fluid according to the specific application of the actuator, without departing from the scope of this disclosure.

Figure 1A:
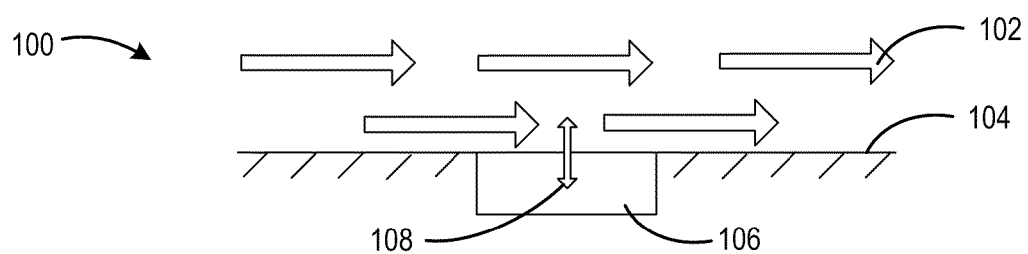
FIG. 1A is a side view representation of a fluid actuation system providing an actuating flow to an ambient airflow according to various embodiments presented herein.

In the following detailed description, references are made to the accompanying drawings that form a part hereof, and which are shown by way of illustration, specific embodiments, or examples. Like numerals represent like elements through the several figures. Referring now to FIG. 1A, an illustrative flow actuation environment 100 will be described. According to one embodiment, the flow actuation environment 100 includes an ambient airflow 102 over a surface of a structure 104. The structure 104 may be the skin of an aircraft, rocket, missile, or other vehicle. A multi-stage synthetic jet actuator 106, according to the various embodiments described below, is positioned under the exposed surface of the structure 104, and is operative to expel and draw an actuating flow 108 into and out of the ambient airflow 102.

Figure 1B:
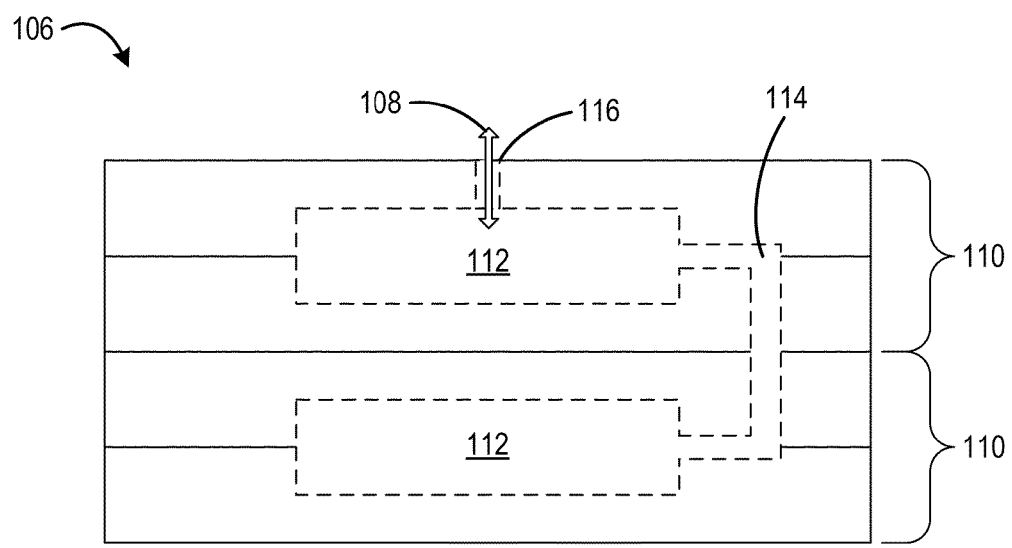
FIG. 1B shows a schematic diagram of the multi-stage synthetic jet actuator according to various embodiments presented herein.

FIG. 1B shows a simplified schematic diagram of the multi-stage synthetic jet actuator 106 to illustrate the concepts that are explained in detail below with respect to FIGS. 2-5. As seen in FIG. 1B, the multi-stage synthetic jet actuator 106 may include any number of actuator stages 110 aligned along an axis and stacked on top of one another. Each stage 110 includes a plenum 112 that is expanded and contracted using one or two diaphragms (not shown in FIG. 1B). The expansion and contraction of the plenums 112 creates the actuating flow 108 that flows between plenums 112 via pathway 114 and in and out of the multi-stage synthetic jet actuator 106 via an exit aperture 116. The stacked, multi-stage configuration of multiple stages 110 allows for the aggregation of the actuating flows 108 of each stage 110 to create the actuating flow 108 that possesses the increased actuating flow velocity that enables the embodiments described herein to be effective in high velocity applications. The diaphragms of the multi-stage synthetic jet actuator 106 described herein are each disclosed to be a piezoelectric disc, or are driven by a piezoelectric disc, which reacts to an electrical input to create an oscillating linear movement that expands and contracts a corresponding plenum 112. Any other diaphragm or mechanism for creating the sufficient oscillatory motion to adequately act on a corresponding plenum 112 may be used.

Figure 2:
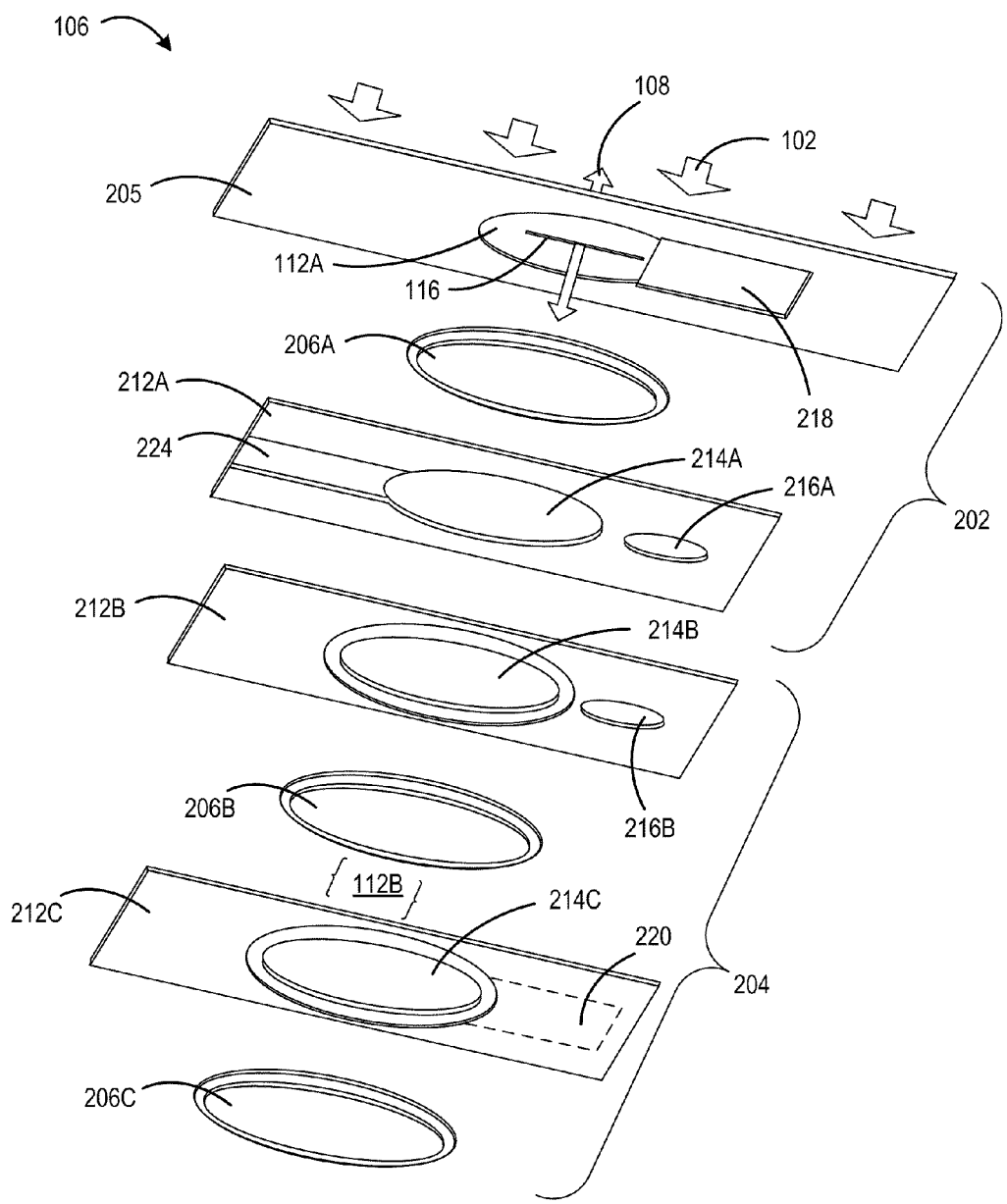
FIG. 2 is an exploded perspective view of a fluid actuation system having two actuation mechanisms according to various embodiments presented herein.

FIG. 2 shows a more detailed, exploded view of a multi-stage synthetic jet actuator 106 according to one embodiment. According to this embodiment, the multi-stage synthetic jet actuator 106 includes an interior actuation mechanism 202 and a peripheral actuation mechanism 204 that make up the two stacked stages 110 shown in FIG. 1B, which work together to provide the actuating flow 108. The interior actuation mechanism 202 includes a piezoelectric disc 206A that reacts to electrical input to compress and expand a first plenum 112A between the piezoelectric disc 206A and a panel 205. The panel 205 may be the structure 104 itself, or may be a plate of any suitable material that is then mounted, bonded to, or otherwise positioned against an interior surface of the structure 104.

When describing the multi-stage synthetic jet actuator 106 according to the embodiments shown in FIGS. 2 and 3, the components will be described using a number-only designation when discussed generally, and using a number and letter combination to refer to a specific component shown in the illustrations. For example, looking at FIG. 2, "piezoelectric disc 206" would refer to all piezoelectric discs having "206" in the reference number in the figures, including 206A, 206B, and 206C. In contrast, "piezoelectric disc 206A" would only refer to the specific piezoelectric disc 206A shown in the interior actuation mechanism 202.

As seen in FIG. 2, the piezoelectric disc 206A is mounted within a disc aperture 214A of a disc plate 212A. Disc plates 212 described herein may be manufactured from any suitable material and are sized and configured to receive a piezoelectric disc 206 within a disc aperture 214. By bonding the disc plate 212 to an adjacent disc plate 212 or panel 205, an airtight seal is formed between the two bonded components preventing air or other applicable fluid from penetrating or moving between components, except through designed fluid routes or vents as will be described below. It will become clear that the bonding of adjacent disc plates 212 within an actuation mechanism may form a plenum for the creation of a portion of the actuating flow 108, while the bonding of disc plates 212 between adjacent disk plates 212 may result in venting to maximize the efficiency of the piezoelectric discs 206.

The disc aperture 214A allows for an airtight seal between the disc plate 212A and the panel 205, while allowing for the oscillating motion of the piezoelectric disc 206A. The air chamber, or first plenum 112A, is created between the panel 205 and the piezoelectric disc 206A. Although the first plenum 112A is shown to be recessed into the panel 205, it should be appreciated that the disc plate 212A may be configured with a thickness that allows the piezoelectric disc 206A to be recessed within the plate to create the first plenum 112A. The actuating flow 108 is pushed out of the first plenum 112A through an exit aperture 116 of the panel 205. The exit aperture 116 may be configured as a slit or any other opening having the desired dimensions and properties to expel the actuating flow 108 with optimized characteristics. These precise characteristics of the exit aperture 116, as well as the precise dimensions and characteristics of other components of the multi-stage synthetic jet actuator 106 are a design choice that can be made by those with skill according to the desired actuating flow 108 output.

The panel 205 is shown to have an inlet 218 to the first plenum 112A. The inlet 218 provides a path for the portion of the actuating flow 108 coming from the peripheral actuation mechanism 204 to enter the first plenum 112A. As discussed above with respect to the configuration of the first plenum 112A, the inlet 218 may alternatively be created via a depression or recessed portion of a top side (not shown) of the disc plate 212A, rather than being formed within the panel 205. A fluid routing aperture 216A provides a fluid path through the disc plate 212A and into the inlet 218 of the interior actuation mechanism 202 from the peripheral actuation mechanism 204.

To increase the flow velocity of the actuating flow 108, the multi-stage synthetic jet actuator 106 includes the peripheral actuation mechanism 204, which is configured as a second stage 110 of the actuator that is stacked on top of the interior actuation mechanism 202. As will be seen and described below with respect to FIG. 3, any number of additional intermediate actuation mechanisms may be included between the interior and peripheral actuation mechanisms shown in FIG. 2 in order to further increase the velocity of the actuating flow 108. The peripheral actuation mechanism 204 includes a disc plate 212B and a disc plate 212C, having piezoelectric discs 206B and 206C, respectively, mounted within.

The bonding of the disc plate 212C to the disc plate 212B creates a second plenum 112B between the piezoelectric disc 206B and the piezoelectric disc 206C. According to one embodiment, the size of the second plenum 112B may be established according to the amount that one or both of the piezoelectric discs 206B and/or 206C is recessed within the disc plates 212B and/or 212C, respectively. The actuating flow 108 is routed from the second plenum 112B to a fluid routing aperture 216B by an outlet 220. The outlet 220 may be similarly configured as the inlet 218, and may be formed within the disc plate 212C, or alternatively within the disc plate 212B. Together, the outlet 220, the fluid routing apertures 216A and 216B, and the inlet 218 provide a path for the actuating flow 108 to travel between the second plenum 112B and the first plenum 112A. It should be appreciated that the configuration of flow path between plenums within the multi-stage synthetic jet actuator 106 is not limited to the shape, size, or location of the outlet 220, fluid routing apertures 216A and 216B, or inlet 218 shown in FIG. 2 or 3.

By bonding the disc plate 212A to the disc plate 212B when stacking the interior actuation mechanism 202 and the peripheral actuation mechanism 204, the typical airtight seal between adjacent disc plates 212 could create a vacuum and/or pressurized space between the piezoelectric disc 206A and the piezoelectric disc 206B. Because the piezoelectric discs 206A and 206B linearly oscillate toward and away from one another, any vacuum or pressurization could impede this movement, which could result in a degraded efficiency or performance of the multi-stage synthetic jet actuator 106. To prevent this problem, a vent 224 is provided between the disc plates 212A and 212B.

The vent 224 includes a depression or channel in the disc plate 212A that extends from the space between the piezoelectric discs 206A and 206B outward to an edge of the plates. Various configurations of this channel, as well as alternative implementations of the vent 224 will be shown and discussed below with respect to FIGS. 3-5. By utilizing the vent 224, the space between the plates is exposed to the ambient atmosphere, which allows the piezoelectric discs 206A and 206B to operate unimpeded. The vent 224 may alternatively be formed in a top side (not shown) of disc plate 212B in addition to, or instead of, in disc plate 212A as shown. Due to the linear displacement of the piezoelectric discs 206A and 206B toward and away from one another, and because the vent 224 provides an outlet to the space between the two discs that allows air to move freely between the two plates, there will be an induced airflow in and out of the vent 224. Although not shown, it is contemplated by this disclosure that this vent flow may be coupled with any other vent flow from the mating of other stages 110 of the multi-stage synthetic jet actuator 106 and routed to a second exit aperture to further actuate the ambient airflow 102.

In operation, according to one embodiment, the piezoelectric discs 206 within a single stage 110 will move 180 degrees out of phase with respect to one another. In doing so, the piezoelectric discs 206, which provide opposing sides to the plenum 112 between the discs, simultaneously move inward to compress the plenum 112, and outward to expand the plenum 112. This alternating compression and expansion of the plenum 112 creates the actuating flow 108. The frequency of the oscillations can be controlled according to the characteristics of the piezoelectric discs 206 and/or electrical input provided to the discs in order to produce the desired flow characteristics of the actuating flow 108. It should be appreciated that the phase differential between piezoelectric discs 206 of the various stages 110 will depend on the lengths of the flow paths between stages 110.

Turning now to FIG. 3, an alternative embodiment will be described in which the multi-stage synthetic jet actuator 106 includes three stages 110 of actuator mechanisms. According to this embodiment, the multi-stage synthetic jet actuator 106 includes the interior actuation mechanism 202 and the peripheral actuation mechanism 204 described above with respect to FIG. 2. However, the multi-stage synthetic jet actuator 106 further includes an intermediate actuation mechanism 302 that is disposed between the interior actuation mechanism 202 and the peripheral actuation mechanism 204. This intermediate actuation mechanism provides a third stage 110 to the multi-stage synthetic jet actuator 106 that further increases the flow velocity of the actuating flow 108. While only three stages 110 are shown in the figures, it should be understood that any number of intermediate actuation mechanisms may be added to the stack of actuation mechanisms to further alter the characteristics of the actuating flow 108 as desired.

Similar to the peripheral actuation mechanism 204, the intermediate actuation mechanism 302 includes two disc plates 212D and 212E, having disc apertures 214D and 214E for receiving the piezoelectric discs 206D and 206E, respectively. The mating of disc plates 212D and 212E creates the third plenum 112C. Fluid routing aperture 216D provides a path for the actuating flow 108 to travel between the third plenum 112C and the first plenum 112A, while fluid routing aperture 216E provides a path for the actuating flow 108 from the second plenum 112B. An outlet 304 provides a path from the third plenum 112C to the fluid routing aperture 216D to complete the open route between the first and third plenums 112A and 112C. As described above with respect to the inlet 218 and the outlet 220, the outlet 304 is not limited to the configuration shown in FIG. 3 and may be included in disc plates 212D, 212E, or partially within both.

FIGS. 3-5 further illustrate two alternative embodiments corresponding to the vent 224 between stages 110 of the multi-stage synthetic jet actuator 106. As seen in disc plate 212A and previously described with respect to FIG. 2, the vent 224 may be a depression or channel formed within either disc plate 212 (or both) bordering an adjacent stage 110. FIG. 4 shows a cross-sectional view of disc plate 212A to illustrate the vent channel 402 in greater detail according to one embodiment.

A second embodiment corresponding to the vent 224 is to use a vent plate 312 as shown in FIG. 3 as separating the intermediate actuation mechanism 302 from the peripheral actuation mechanism 204. The vent plate 312 is a separate plate similar to the disc plates 212, but without a corresponding piezoelectric disc 206 mounted within. The vent plate 312 includes a routing aperture 316 to allow the actuating flow 108 to flow between stages. The vent plate 312 may also include a vent aperture 314 to allow for the unimpeded movement of adjacent piezoelectric discs 206E and 206B. The vent aperture 314 is vented to ambient atmosphere using vent channels 502 on opposing sides of the vent plate 312, as shown in the cross-sectional view of the vent plate 312 illustrated in FIG. 5.

It should be appreciated that the vent plate 312 may alternatively include a single vent channel 502 on either side of the vent plate 312, similar to the vent 224 shown in FIG. 4. It should further be appreciated that the vent plate 312 is an alternative to utilizing vent channels 402 in one or both disc plates 212 bordering an adjacent stage 110. For example, instead of utilizing the vent plate 312 in the embodiment shown in FIG. 3, either or both of disc plates 212E and 212B could include a vent channel 402, similar to disc plate 212A. Similarly, rather than the disc plate 212A including the vent channel 402 as shown, a vent plate 312 could be used between disc plates 212A and 212D to vent the space between the interior actuation mechanism 202 and the intermediate actuation mechanism 302.

Finally, according to yet another alternative embodiment, adjacent disc plates 212 between adjacent stages 110 may include only a single disc plate 212 on which adjacent piezoelectric discs 206 are mounted. For example, looking at FIG. 4, it is contemplated that piezoelectric disc 206A could be mounted to the disc plate 212D, eliminating disc plate 212A. In doing so, the disc aperture 214D would be vented to eliminate any pressure between the piezoelectric discs 206A and 206D.

Figure 6:
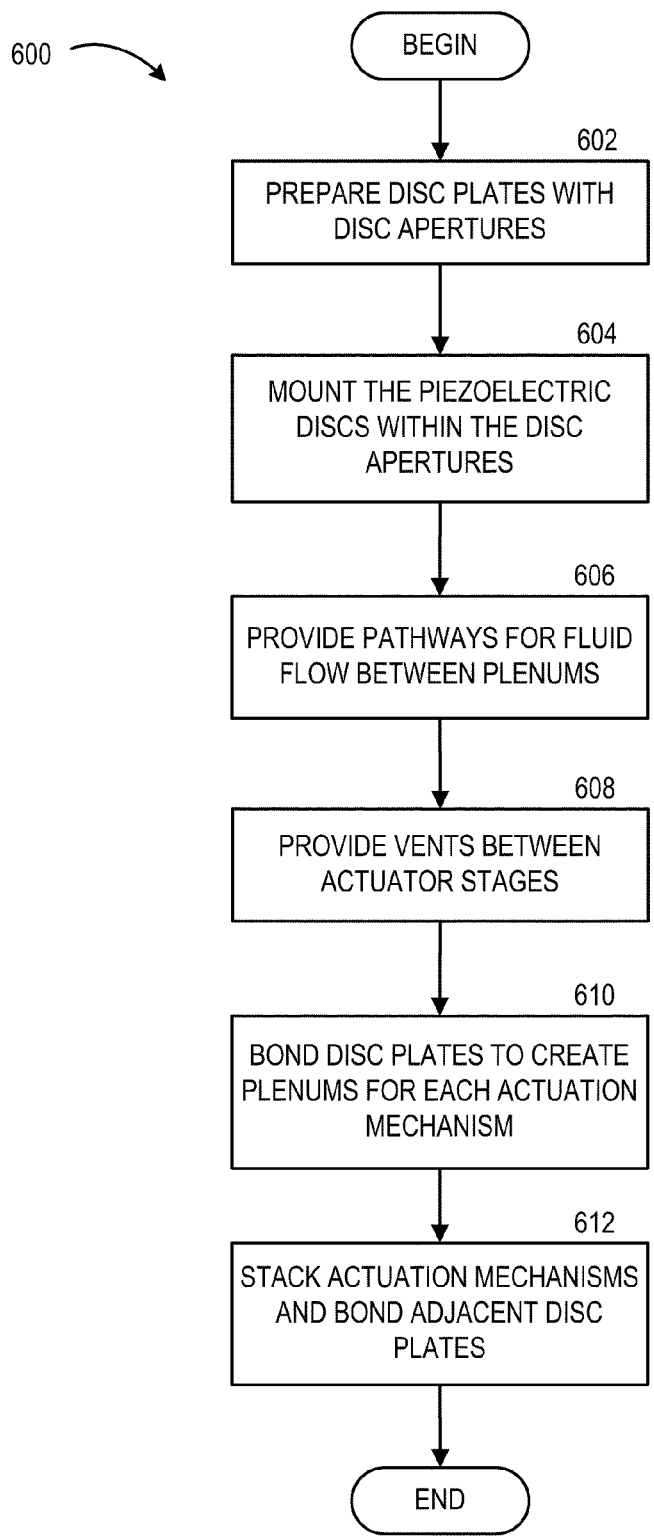
FIG. 6 is a flow diagram showing a method for providing a multi-stage synthetic jet actuator according to various embodiments presented herein.

Turning now to FIG. 6, an illustrative routine 600 for providing a multi-stage synthetic jet actuator 106 will now be described in detail. It should be appreciated that the logical operations described herein with respect to FIGS. 6 and 7 may be implemented (1) as a sequence of computer implemented acts or program modules running on a computing system and/or (2) as interconnected machine logic circuits or circuit modules within the computing system. The implementation is a matter of choice dependent on the performance and other requirements of a computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where disc plates 212 are prepared with disc apertures 214. At operation 604, the piezoelectric discs 206 are mounted within the corresponding disc apertures 214 of the disc plates 212. The pathways 114 are provided at operation 606 to fluidically connect the various plenums 112. As described above, these pathways 114 may include fluid routing apertures 216, as well as inlet 218 and an outlet corresponding to each stage 110, such as outlet 220 for a two-stage actuator and outlets 220 and 304 for a three-stage actuator. From operation 606, the routine 600 continues to operation 608, where venting is provided between stages 110 of the multi-stage synthetic jet actuator 106. For example, vent channels 402 may be used in one or both of adjacent disc plates 212 between stages 110, or vent plates 312 may be used between stages 110. At operation 610, the disc plates 212 are bonded together to create plenums 112 for the actuator mechanisms of each stage 110. The routine 600 continues to operation 612, where the actuation mechanisms representing each stage 110 are stacked and bonded together to complete the multi-stage synthetic jet actuator 106, and the routine 600 ends.

Figure 7:
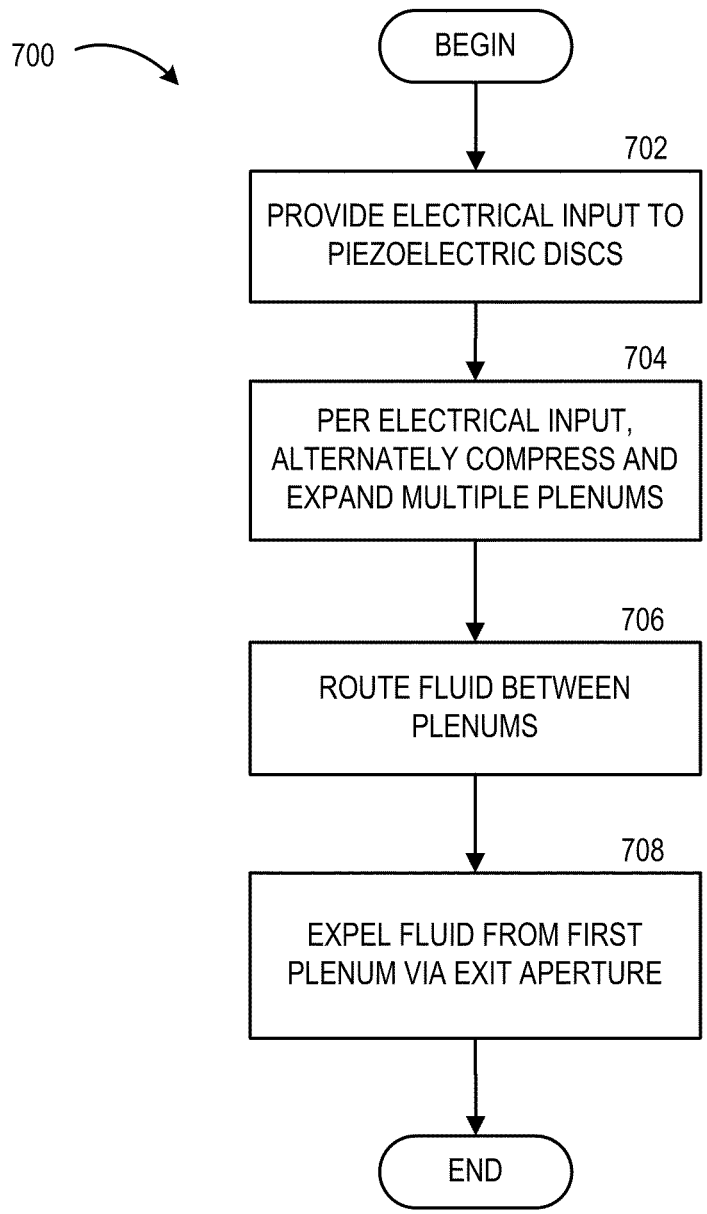
FIG. 7 is a flow diagram showing a method for providing an actuating fluid flow utilizing a multi-stage synthetic jet actuator according to various embodiments presented herein.

Looking at FIG. 7, an illustrative routine 700 for providing an actuating flow 108 utilizing a multi-stage synthetic jet actuator 106 will now be described in detail. The routine 700 begins at operation 702, where electrical input is provided to the piezoelectric discs 206. In response to the electrical input, at operation 704, the piezoelectric discs 206 oscillate to alternately compress and expand the plenums 112 of each stage 110 of the multi-stage synthetic jet actuator 106. As discussed above, opposing piezoelectric discs 206 within a single stage oscillate 180 degrees out of phase with one another so as to simultaneously and alternately compress and expand the plenum 112 between the discs. The compression and expansion of the plenums 112 creates an actuating flow 108 that is routed between the plenums 112 via the pathways 114 at operation 706. At operation 708, the actuating flow 108 is expelled from the first plenum 112A into the ambient airflow 102 via the exit aperture 116, and the routine 700 ends.

Based on the foregoing, it should be appreciated that technologies for providing a multi-stage synthetic jet actuator have been disclosed herein. It is to be understood that the invention defined in the appended claims is not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A fluid actuation system, comprising:
an interior actuation mechanism comprising at least a first diaphragm, a first plenum, and a first diaphragm plate having a first diaphragm aperture sized to receive the first diaphragm, the first diaphragm adapted to expel fluid from the first plenum through an exit aperture;
a panel, the panel having a first side facing a fluid flow to be actuated and a second side facing the interior actuation mechanism, wherein the second side of the panel provides a side of the first plenum, and wherein the panel comprises the exit aperture such that the fluid is expelled from the first plenum adjacent to the second side of the panel through the exit aperture to the first side of the panel into the fluid flow to be actuated; and
a peripheral actuation mechanism comprising:
a second diaphragm and a third diaphragm encompassing a second plenum fluidically coupled to the first plenum, the second diaphragm and the third diaphragm adapted to expel fluid from the second plenum into the first plenum,
a second diaphragm plate having a second diaphragm aperture sized to receive the second diaphragm, and
a third diaphragm plate having a third diaphragm aperture sized to receive the third diaphragm,
wherein the panel, the interior actuation mechanism, and the peripheral actuation mechanism are positioned in a stacked configuration such that the first diaphragm plate abuts the panel and defines the first plenum between the second side of the panel and the first diaphragm, the second diaphragm plate abuts the first diaphragm plate, and the third diaphragm plate abuts the second diaphragm plate and defines the second plenum between the second diaphragm and the third diaphragm, substantially aligning the first diaphragm, the second diaphragm, and the third diaphragm along an axis.

2. The fluid actuation system of claim 1, wherein the first diaphragm, the second diaphragm, and the third diaphragm each comprise a piezoelectric disc.

3. The fluid actuation system of claim 2, wherein the fluid comprises air and wherein the exit aperture comprises an aperture in an aircraft skin such that the fluid actuation system expels air into an ambient airflow through the aperture in the aircraft skin.

4. The fluid actuation system of claim 1,
wherein the first diaphragm plate further comprises a first fluid routing aperture configured to route the fluid from the second plenum to the first plenum, and
wherein the second diaphragm plate further comprises a second fluid routing aperture configured to route fluid from the second plenum to the first fluid routing aperture.

5. The fluid actuation system of claim 1, further comprising an intermediate actuation mechanism positioned between the interior actuation mechanism and the peripheral actuation mechanism, the intermediate actuation mechanism comprising a fourth diaphragm and a fifth diaphragm encompassing a third plenum fluidically coupled to the first plenum, the fourth diaphragm and the fifth diaphragm adapted to expel fluid from the third plenum into the first plenum.

6. The fluid actuation system of claim 5, further comprising a first vent disposed between the interior actuation mechanism and the intermediate actuation mechanism, and a second vent disposed between the intermediate actuation mechanism and the peripheral actuation mechanism, wherein each of the first and second vents is adapted to depressurize any space between adjacent diaphragms.

7. The fluid actuation system of claim 6, wherein at least one of the first and second vents comprises a vent plate configured to abut adjacent diaphragm plates and having a diaphragm aperture adapted to expose a space between adjacent diaphragms to ambient atmosphere.

8. A fluid actuation system, comprising:
a plurality of stages, each stage comprising
a plenum defined between a panel or diaphragm plate and an abutting diaphragm plate, and
at least one piezoelectric disc adapted to alternately compress and expand the plenum,
wherein the plurality of stages are positioned in a stacked configuration with each piezoelectric disc and plenum aligned along a central axis;
a pathway fluidically connecting each plenum; and
an exit aperture adapted to expel an actuating flow created by the compression and expansion of each plenum.

9. The fluid actuation system of claim 8, wherein the plurality of stages comprises a first stage having a first plenum and a first piezoelectric disc, and a second stage having a second plenum defined on opposite sides by a second piezoelectric disc and a third piezoelectric disc, and wherein the exit aperture is positioned within the first plenum.

10. The fluid actuation system of claim 8, further comprising a vent positioned between each of the plurality of stages, the vent adapted to expose a space between adjacent stages to ambient atmosphere.

11. The fluid actuation system of claim 8, wherein the fluid actuation system is positioned within an airfoil such that the actuating flow is expelled into an ambient airflow over the airfoil.

\* \* \* \* \*